Sept. 26, 1933. H. J. WOOCK ET AL 1,928,404
METHOD AND APPARATUS FOR RETREADING TIRES
Filed Aug. 20, 1928   2 Sheets-Sheet 2

INVENTORS
*H. J. Woock, C. J. Peterson
and J. S. Caufield*
BY ATTORNEY

Patented Sept. 26, 1933

1,928,404

UNITED STATES PATENT OFFICE 1,928,404

METHOD AND APPARATUS FOR RETREADING TIRES

Herbert J. Woock, Lodi, and Charles J. Peterson and Jacob S. Caufield, Sacramento, Calif., assignors, by mesne assignments, to Super Mold Corporation, Reno, Nev., a corporation of Nevada Application August 20, 1928. Serial No. 300,858

10 Claims. (Cl. 18—18)

This invention relates to tire retreading molds and particularly represents modifications over the structure shown in Patent No. 1,662,035, dated March 6, 1928, to Messrs. Smith, Caufield and Peterson.

In this previous device the tread of the tire to be vulcanized was forced into firm engagement with the matrix of the mold by means of presser rings or plates disposed against the outside of the tire inwardly of the tread portion, and which when advanced toward each other against the resistance of the pressure offered by the inflated tire, caused the tread portion of the latter to be forced outwardly against the matrix.

With tires of certain sizes and tread shapes, however, we have found that while the rings effectively pressed the central portion of the tread sometimes the tread as a whole did not engage the matrix with pressure sufficient to provide the necessary adhesion between the parts during the vulcanizing operations.

This condition arises from the following causes, i. e. tires when newly made are, theoretically at least produced in certain stated sizes—that is, the tire is presumed to have a standard circumferential diameter and a standard cross sectional diameter. In fact, however, due to various factors, the supposedly standard measurements vary to a considerable degree especially with respect to tires manufactured by different companies, but presumably all of such standard dimensions.

Then again after a tire has been in service the stresses and strains to which it has been subjected tend to measurably stretch or distort it, which results in altering its presumably standard dimensions.

These variations, from whatever cause, are in the main very slight and would not be noticeable under ordinary conditions. When it is desired to retread the tire however they become of marked significance.

A successful retreading of a tire cannot be accomplished unless there is a positive and close fit between the portion of the tire to be retreaded and the tread forming matrix of the retreading mold. If there is not such positive and close fit the rubber will not properly cure but will be soft and spongy. If there is too tight a fit the fabric of the tire will buckle and then, after the tire goes into use, the buckled part will spread and tear the tread.

From the standpoint of the operator in the retreading of tires it is only practical to have a mold matrix of standard dimensions for each theoretically standard size tire. In such a mold a tire of true theoretical standard size could be perfectly retreaded in its correspondingly sized matrix. The stated variations from the theorectical standard sizes however has rendered the problem of successful retreading of tires a difficult one. This is especially true in the operation of retreading tires in what is known as a full circle mold wherein the entire tread of the tire is retreaded in one operation.

It will be obvious that since these many variations from presumed tire sizes do occur, and since it is necessary that there must be a positive and close fit between the tire and mold to successfully retread a tire, and since it would not be practical to have a different sized matrix for every one of the many slight variations, therefore some method must be devised to compensate for the variation from standard size in each instance so that the tire may be caused to properly fit the mold provided with matrices of the supposedly standard size of the particular tire to be worked upon.

The principal object of the present invention is therefore to provide an improved and efficient means for so compensating for these variations that a tire of theoretical standard dimensions may be caused to properly fit the correspondingly standard matrices of the retreading mold to the end that a perfect retreading of the tire may be made possible.

These objects we accomplish by means of such structure and relative arrangement of parts as will fully appear by a perusal of the following specifications and claims.

In the drawings similar characters of reference indicate corresponding parts in the several views.

Figure 1:
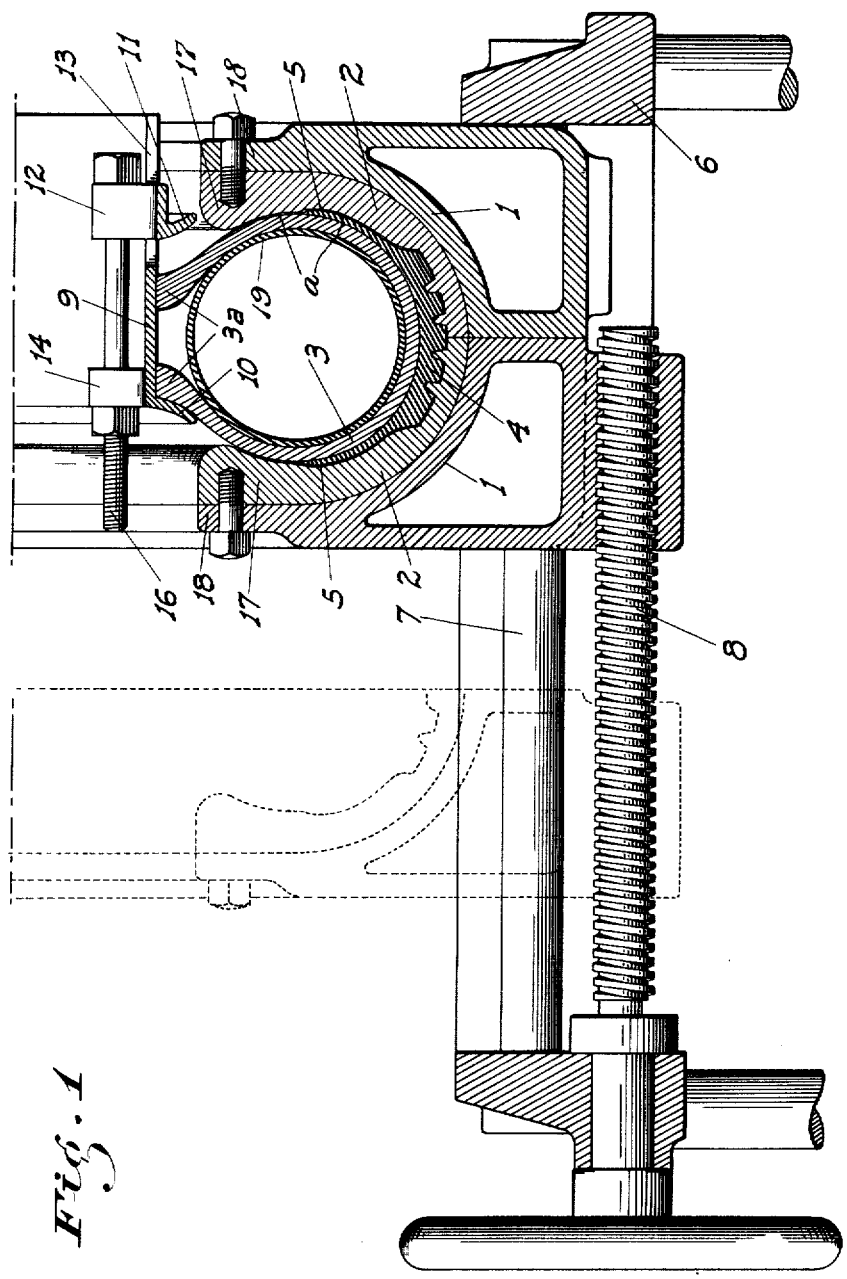
Fig. 1 is a sectional elevation of our improved mold structure showing the tire in place and before being inflated.

Referring now more particularly to the characters of reference on the drawings, the numeral 1 denotes a pair of mold sections in which matched matrix members 2 are detachably mounted. The matrix is arranged to receive the tire 3 to be retreaded, the retreading rubber 4 and the corresponding recessed surface 5 of the matrix extending approximately to the center of cross sectional area of the tire as usual. One mold section is rigidly secured to a supporting frame 6, while the other section is slidable on bars 7 mounted on the frame and is engaged by a screw 8 mounted in the frame parallel to the bars, so that said section may be moved to and from the fixed section.

The beads 3a of the tire fit snugly on the base band 9 of a special rim, only one side flange 10 of which is formed integral with the band. The other flange 11 is slidable laterally on the rim band and at intervals has lugs 12 projecting inwardly through transverse slots 13 cut in the band. These lugs transversely aline with other lugs 14 fixed on the rim band, both sets of lugs being slotted as at 15 to removably support bolts 16. By means of this arrangement it will be seen that the movable flange may be advanced or retracted relative to the fixed flange as may be required by suitably adjusting the bolts. Though the above structure is the preferred way of adjusting the movable flange, other mechanical equivalents of such structure may of course be employed instead if desired.

The matrix members are provided with skirts 17 which depend inwardly of the tread engaging portion 5 and substantially follow the normal contour of the tire inwardly of said tread portion and closely adjacent thereto, and extend about to the rim flanges.

To brace these skirts the mold sections have corresponding extensions 18 against which the skirts abut.

We will now describe in detail the operation of the described mechanism to accomplish the objects of the invention as hereinbefore stated.

With particular reference to Fig. 1 we will assume that the tire there shown is of a certain theoretical standard cross sectional dimension and that the matrix shown is that which has a standard dimension corresponding to the theoretical dimension of the tire. The tire as shown in said Fig. 1 is in the normal position that it would assume if mounted on its normal supporting rim and the tire was inflated. Assume further that the tire is in fact one which has a variation from such theoretical dimensions, i. e. it is slightly smaller in its cross sectional dimension than the cross sectional dimension of the matrices of the retreading mold as shown. Thus if this tire was mounted on its normal standard rim and put into the mold for retreading, when the air bag was inflated to bring the tire out to its normal size it would, due to the variation stated, not quite fit the mold matrices, so that, unless stretched, there would be a slight air space between the tire and the matrices as shown in Fig. 1, at "a", or at best there would not be that close and positive fit necessary to a successful retreading of the tire.

Figure 2:
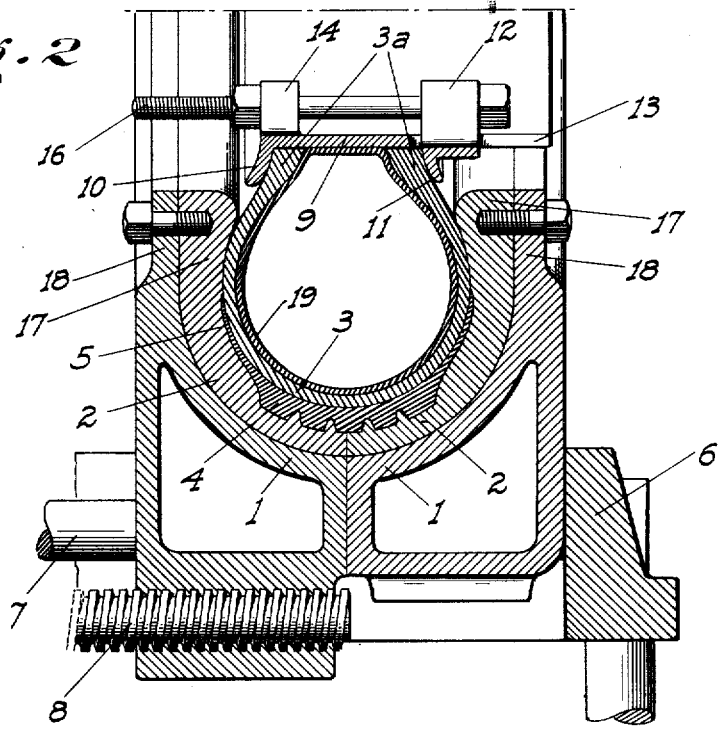
Fig. 2 is a similar view showing the tire as inflated.
Figure 3:
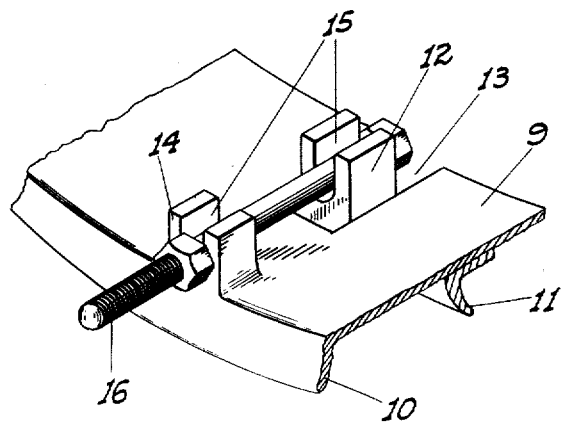
Fig. 3 is a fragmentary perspective view of an adjustable rim structure.

To compensate for this variation and discrepancy the operator instead of using the standard rim on which the tire would normally be mounted makes use of our adjustable rim. The movable rim 11, may be adjusted relative to the fixed rim 10 through the medium of the bolts 16 so that the width of the band 9 may be made just enough greater than would be the width of the band of a standard rim on which the tire would normally be placed, so that when the tire was inflated the pressure would move the beads and side walls of the tire outwardly a distance to compensate for and overcome the variation in diameter and cause the tire to have that positive and close fit in the mold, without stretching the same, as shown in Fig. 2, to assure a proper curing of the new tread. The sides of the tire between the rim and the matrix proper are prevented from bulging outwardly by the skirts 17. The tendency for the tire to expand is therefore confined where it is most necessary—that is in the area of the matrix actually engaged by the tread rubber. If perchance the adjustment of the rim was such that the diameter of the tire was extended a little greater than actually necessary these skirts 17 would then act as do the pressure plates in the above mentioned patent, i. e. they would move against the side walls of the tire and move the tread into a positive and tight fit within the tread forming matrices of the mold.

As a result the entire tread area of the tire is forced with practically equal pressure against the matrix merely by inflating the air bag in the tire to the proper pressure, and without any tendency for the tire to be stretched or strained with such pressure.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A tire retreading mold structure including a matrix to engage the tread portion of a tire, means for enabling the tire to be inflated, and a rim on which the beads of the tire are mounted, said rim including side flanges adjustable to vary the normal spacing of the tire beads relative to each other.

2. A structure as in claim 1, with skirts projecting inwardly from the tread engaging portion of the matrix to adjacent the flanges and substantially following the contour of the corresponding portion of the tire closely adjacent thereto.

3. The method of forcing the tread portion of a tire into firm engagement with the matrix of a retreading mold consisting in placing the tire in the mold in a matrix engaging position, inflating the tire, and allowing the tire when inflated to spread in the plane of its rim-beads without being stretched so as to move the tread portion both laterally and outwardly against the matrix.

4. In combination with a tire retreading mold, a rim on which a tire to be retreaded is mounted before being placed in the mold; said rim having opposed flanges to engage the tire beads, such flanges being adjustable transversely relative to each other to vary the possible spread of the tire beads from normal when the tire is inflated.

5. A tire-supporting rim for use in connection with a tire-retreading mold comprising a baseband to fit the beads of the tire, a bead engaging flange integral with the band on one side of the same, an opposed bead engaging flange slidable transversely on the band, and means between the band and said movable flange for adjusting the same transversely and for holding the flange in any adjusted position.

6. The method of fitting a tire into the matrix of a retreading mold consisting in adjusting the beads of the tire laterally so that the tire at its point of greatest width will properly engage the matrix without the matrix engaging portion of the tire being stretched or distorted, and inflating the tire while maintaining the beads in such adjusted position.

7. A full circle vulcanizing mold for retreading tires comprising mold sections to receive the tread portion of the tire, and a supporting and retaining means for the tire, separate from the mold sections and comprising a flat rim on which the base of the tire beads rest and flanges on the rim to confine the side walls of the beads, such flanges being movable axially relative to each other, while maintaining the base of the beads in substantially full surface contact with the rim.

8. That method of fitting a tire to a full circle retreading mold adapted to receive the tread portion of the tire comprising the step of moving the bead portions of the tire axially thereof until the tread properly fits the mold and then confining the beads against further movement.

9. That method of fitting a tire of a certain tread diameter into a full circle retreading vulcanizing mold of a different tread diameter, comprising the step of moving the bead portions of the tire axially and in opposite directions, whereby to vary the tread diameter of the tire until it equals that of the mold, and then confining the bead portions of the tire against further movement.

10. A tire retreading mold structure including a matrix to engage the tread portion of a tire, an expansible core to permit inflation of the tire, a rim on which the bead portions of the tire are supported, said rim including side flanges, one flange being movable relative to the other, and means applied to said movable flange for altering the spacing between the flanges at will.

HERBERT J. WOOCK.
CHARLES J. PETERSON.
JACOB S. CAUFIELD.

DISCLAIMER 1,928,404.—*Herbert J. Woock*, Lodi, and *Charles J. Peterson* and *Jacob S. Caufield*, Sacramento, Calif. METHOD AND APPARATUS FOR RETREADING TIRES. Patent dated September 26, 1933. Disclaimer filed October 26, 1940, by the assignee, *Super Mold Corporation of California*.

Hereby enters this disclaimer to claims 3, 6, 8 and 9.

[*Official Gazette November 26, 1940.*]

the tire while maintaining the beads in such adjusted position.

7. A full circle vulcanizing mold for retreading tires comprising mold sections to receive the tread portion of the tire, and a supporting and retaining means for the tire, separate from the mold sections and comprising a flat rim on which the base of the tire beads rest and flanges on the rim to confine the side walls of the beads, such flanges being movable axially relative to each other, while maintaining the base of the beads in substantially full surface contact with the rim.

8. That method of fitting a tire to a full circle retreading mold adapted to receive the tread portion of the tire comprising the step of moving the bead portions of the tire axially thereof until the tread properly fits the mold and then confining the beads against further movement.

9. That method of fitting a tire of a certain tread diameter into a full circle retreading vulcanizing mold of a different tread diameter, comprising the step of moving the bead portions of the tire axially and in opposite directions, whereby to vary the tread diameter of the tire until it equals that of the mold, and then confining the bead portions of the tire against further movement.

10. A tire retreading mold structure including a matrix to engage the tread portion of a tire, an expansible core to permit inflation of the tire, a rim on which the bead portions of the tire are supported, said rim including side flanges, one flange being movable relative to the other, and means applied to said movable flange for altering the spacing between the flanges at will.

HERBERT J. WOOCK.
CHARLES J. PETERSON.
JACOB S. CAUFIELD.

DISCLAIMER 1,928,404.—*Herbert J. Woock*, Lodi, and *Charles J. Peterson* and *Jacob S. Caufield*, Sacramento, Calif. METHOD AND APPARATUS FOR RETREADING TIRES. Patent dated September 26, 1933. Disclaimer filed October 26, 1940, by the assignee, *Super Mold Corporation of California*.

Hereby enters this disclaimer to claims 3, 6, 8 and 9.

[*Official Gazette November 26, 1940.*]

DISCLAIMER 1,928,404.—*Herbert J. Woock*, Lodi, and *Charles J. Peterson* and *Jacob S. Caufield*, Sacramento, Calif. METHOD AND APPARATUS FOR RETREADING TIRES. Patent dated September 26, 1933. Disclaimer filed October 26, 1940, by the assignee, *Super Mold Corporation of California*.

Hereby enters this disclaimer to claims 3, 6, 8 and 9.

[*Official Gazette November 26, 1940.*]